3,741,900
CLEANING COMPOSITION

Justin J. Murtaugh, Guilford, Ind., and Robert C. Brown, Cincinnati, Ohio, assignors to The Drackett Company, Cincinnati, Ohio
No Drawing. Filed July 15, 1970, Ser. No. 55,285
Int. Cl. C11d 3/04
U.S. Cl. 252—89                                16 Claims

ABSTRACT OF THE DISCLOSURE

A drain cleaning composition and the method for preparation, containing anhydrous magnesium chloride in combination with other inorganic salts such as but not limited to calcium chloride, sodium chloride and potassium chloride. The method involves fusing the ingredients, granulating and pelletizing or compacting.

---

This invention is concerned with new and improved cleaning compositions which are particularly suitable for use in drains.

The compositions of the present invention contain anhydrous magnesium chloride in combination with another inorganic salt such, but not limited to, for example, calcium chloride, sodium chloride and potassium chloride.

These novel drain cleaning compositions are especially attractive in that they do not require the use of caustic materials which are toxic.

Some representative prior art compositions used heretofore for cleaning drains and the like are shown in U.S. Pats. 3,353,937 (Ford); and 3,077,455 (Racke). The Ford patent discloses compositions containing caustic soda, sodium chloride, sodium nitrate and aluminum. The Racke patent discloses compositions containing an alkali metal hydroxide, sodium nitrate and aluminum. These known cleaning compositions generate heat upon contact with water.

The present invention has solved a particularly difficult problem in using anhydrous magnesium chloride and at the same time has provided a simple inexpensive, and non-toxic drain cleaning composition. Anhydrous magnesium chloride occurs as crystalline laminated plates similar to mica. In this form, the material has little or no use as a drain cleaner.

It has now been found possible to alter the physical properties of anhydrous magnesium chloride and to incorporate it into a formulation with other inorganic salts to yield a new non-toxic heat-producing drain cleaner.

The formulation of the invention produce heat upon contact with water. Due to the rapid rate of solution and the exothermic properties of anhydrous magnesium chloride, 21.2 grams of the material will raise the temperature of 100 grams of water from 20° C. to boiling.

In accordance with the present invention anhydrous magnesium chloride is melted and then mixed with another inorganic metal salt to cause fusing. Upon cooling the mixture solidifies as a super-cooled solution and the undesirable laminated crystalline form is altered to an amorphous glass-like state. In this form it is possible to obtain controlled granulation so that a useful drain-cleaning product may be prepared.

In accordance with the invention it has been determined that when 10–80% by weight of the inorganic salt is added to 90–20% by weight of anhydrous magnesium chloride an effective heat-producing drain-cleaning composition results, having a minimum heat of solution of 200 calories per gram. When the compositions are prepared in accordance with the invention the crystalline structure of the magnesium chloride is changed to effect a hard, glass-like amorphous super-cooled solution. The combination of materials in this form can be granulated into particles of controlled size so that a highly effective heat-producing drain-cleaning composition may be prepared. A composition containing from 55.5% to 90.0% by weight of anhydrous magnesium chloride and 10.0% to 44.5% by weight of sodium chloride represents one of the preferred embodiments of the invention.

Various inorganic salts are contemplated as being useful for practicing the invention. For example such salts as metal chlorides, phosphates, sulfates, bisulfates, and nitrates have been found to give good heat-producing drain-cleaning compositions.

It has also been determined that the particle size range should be between 4 and 20 mesh (833μ to 4760μ). Larger particle size results in too slow a rate of solution to obtain the temperature rise required to produce a vigorously boiling solution. Moreover, the larger particles do not completely dissolve and hence can contribute to drain blockage. Smaller particles may adhere to the sides of the drain pipes or dissolve rapidly at the surface of the water. When this happens the heat is dissipated at the surface or into the air and is not effective for cleaning the drain.

Many combinations of inorganic salts with the anhydrous magnesium chloride are contemplated by the present invention. The relative amounts of materials may be varied depending on how much is desired to be generated or other considerations such as, for example, cost of materials. However, the composition should have a minimum heat of solution of 200 calories per gram when tested in accordance with the following procedure.

Fifty grams of a fused mixture of the ingredients are added to 850 grams of water at 25° C. in a 1000 ml. Dewar flask, equipped with stopper, stirrer and thermometer. The heat of solution is calculated according to the following relationship, where $t_2$ = final temperature and
$t_1$ = initial temperature $$\frac{t_2 - t_1 \times 850}{50} = \text{calories per gram}$$

The following examples are representative of drain cleaning compositions in accordance with the invention:

EXAMPLE 1
Material (anhydrous)

|  | Percent by weight |
|---|---|
| $MgCl_2$ | 65 |
| $CaCl_2$ | 20 |
| NaCl | 15 |

EXAMPLE 2

| | |
|---|---|
| $MgCl_2$ | 50 |
| $CaCl_2$ | 50 |

EXAMPLE 3

| | |
|---|---|
| $MgCl_2$ | 85 |
| KCl | 15 |

EXAMPLE 4

| | |
|---|---|
| $MgCl_2$ | 50 |
| $CaCl_2$ | 25 |
| NaCl | 25 |

EXAMPLE 5

| | |
|---|---|
| $MgCl_2$ | 40 |
| $CaCl_2$ | 40 |
| KCl | 20 |

EXAMPLE 6

| | Percent by weight |
|---|---|
| $MgCl_2$ | 75 |
| NaCl | 25 |

EXAMPLE 7

| | |
|---|---|
| $MgCl_2$ | 75 |
| $CaCl_2$ | 15 |
| NaCl | 10 |

EXAMPLE 8

| | |
|---|---|
| $MgCl_2$ | 95 |
| $CaCl_2$ | 3 |
| NaCl | 2 |

EXAMPLE 9

| | |
|---|---|
| $MgCl_2$ | 85 |
| $CaCl_2$ | 8 |
| NaCl | 7 |

EXAMPLE 10

| | |
|---|---|
| $MgCl_2$ | 19.5 |
| $CaCl_2$ | 80.5 |

EXAMPLE 11

| | |
|---|---|
| $MgCl_2$ | 55.4 |
| NaCl | 44.6 |

EXAMPLE 12

| | |
|---|---|
| $MgCl_2$ | 59.1 |
| KCl | 40.9 |

EXAMPLE 13

| | |
|---|---|
| $MgCl_2$ | 42.3 |
| $CaCl_2$ | 57.7 |

EXAMPLE 14

| | |
|---|---|
| $MgCl_2$ | 68.0 |
| NaCl | 32.0 |

EXAMPLE 15

| | |
|---|---|
| $MgCl_2$ | 70.7 |
| KCl | 29.3 |

Examples 10, 11 and 12 yield 200 cal./gm. while Examples 13, 14 and 15 yield the preferred value of 250 cal./gm.

EXAMPLE 16

| | |
|---|---|
| $MgCl_2$ | 60 |
| $CaCl_2$ | 40 |

A composition in accordance with Example 16 represents one of the preferred embodiments of the invention. This mixture is a hard super-cooled non-crystalline type of product which can be granulated and used to prepare a very effective heat-producing drain-cleaning composition.

The compositions of the invention should have a pH from 4.0–10.5 with a range of 7.5–8.0 being preferred. Small amounts of acid or base may be added to give the required pH. At a pH above 10.5 undesirable precipitation of magnesium and calcium hydroxide will occur.

The following composition was prepared in accordance with the invention and was tested as a drain cleaner. The composition generated heat upon contact with water and effectively cleaned the drain to allow for passage of subsequent waste deposits through the drain pipes.

EXAMPLE 17

84.6 grams of anhydrous magnesium chloride and 115.4 grams of anhydrous calcium chloride were mixed and fused by melting in a furnace at 800° C. After cooling in a desiccator, the solid was broken apart and granulated and screened. Material passing through a standard U.S. 8 mesh sieve and collected on a standard U.S. 20 sieve was saved. 175 grams of material was collected. This material was a hard, glass-like material and did not have the crystalline structure characteristic of anhydrous magnesium chloride. The heat of solution was 245 calories per gram. 30 grams were added to a drain trap which had previously been plugged with a mixture of melted beef fat, coffee grounds and hair. 30 seconds after the fused granulated calcium chloride magnesium chloride mixture was added, the water in the pipe began to boil vigorously. In 1 minute, 39 seconds, the trap became unplugged and water started to pass through the trap. After 5 minutes, the trap was flushed with cold water and thereafter flowed freely.

What is claimed is:

1. A heat-producing drain-cleaning composition consisting essentially of 55.5%–90.0% by weight of anhydrous magnesium chloride in combination with 10.0%–44.5% by weight of an inorganic alkali metal or calcium salt, said salt being a member of the group consisting of chlorides, phosphates, sulfates, bisulfates, nitrates and mixtures thereof, wherein the heat of solution of said composition is at least 200 calories per gram, and wherein said anhydrous magnesium chloride is in a glass-like amorphous form having a surface area reduced from that of the crystalline form, said composition being adapted for controlled dissolution, generation of heat, and effecting of turbulence upon contact with water.

2. A composition in accordance with claim 1 wherein said metal salt is NaCl.

3. A composition in accordance with claim 1 wherein said metal salt is KCl.

4. A composition in accordance with claim 1 wherein said metal salt is $CaCl_2$.

5. A composition in accordance with claim 1 wherein said metal salt is a mixture of $CaCl_2$ and NaCl.

6. A composition in accordance with claim 1 wherein said metal salt is a mixture of $CaCl_2$ and KCl.

7. A composition in accordance with claim 1 wherein said metal salt is a mixture of $CaCl_2$, NaCl, and KCl.

8. A composition in accordance with claim 1 wherein said metal salt is $Na_2SO_4$.

9. A composition in accordance with claim 1 wherein said metal salt is $Na_2HPO_4$.

10. A composition in accordance with claim 1 wherein said metal salt is $K_2SO_4$.

11. A composition in accordance with claim 1 wherein said metal salt is $K_2HPO_4$.

12. A composition in accordance with claim 1 wherein the anhydrous magnesium chloride is present in an amount of 60% by weight and the inorganic salt is present in an amount of 40% by weight.

13. A composition in accordance with claim 1 wherein the anhydrous magnesium chloride is present in an amount of 70% by weight and the inorganic salt is present in an amount of 30% by weight.

14. A composition in accordance with claim 1 wherein the anhydrous magnesium chloride is present in an amount of 80% by weight and the inorganic salt is present in an amount of 20% by weight.

15. A heat-producing drain-cleaning composition consisting essentially of 55.5%–90.0% by weight of anhydrous magnesium chloride in combination with 10.0%–44.5% by weight of an inorganic alkali metal or calcium salt, said salt being a member of the group consisting of chlorides, phosphates, sulfates, bisulfates, nitrates and mixtures thereof, wherein the heat of solution of said composition is at least 200 calories per gram, and wherein said anhydrous magnesium chloride is in a glass-like amorphous form having a surface area reduced from that of the crystalline form, said composition being adapted for controlled dissolution, generation of heat, and effecting of turbulence upon contact with water, wherein the average particle size of the composition is in the range of 833 to 4760 microns, wherein said composition exhibits a pH in aqueous solution of from about 4.0 to 10.5.

16. A method of preparing a heat-producing drain-cleaning composition consisting essentially of 55.5%–

90.0% by weight of anhydrous magnesium chloride in combination with 10.0%–44.5% by weight of an inorganic alkali metal or calcium salt, and said salt being a member of the group consisting of chlorides, phosphates, sulfates, bisulfates, nitrates and mixtures thereof, wherein the heat of solution of said composition is at least 200 calories per gram, and wherein said anhydrous magnesium chloride is in a glass-like amorphous form having a surface area reduced from that of the crystalline form, said composition being adapted for controlled dissolution, generation of heat, and effecting of turbulence upon contact with water, comprising:

(a) melting crystalline anhydrous magnesium chloride together with said inorganic salt to cause fusing;
(b) cooling the mixture so that it solidifies as a super-cooled solution and so that the magnesium chloride is no longer in crystalline form; and
(c) granulating said super-cooled solution into heat-producing powder.

References Cited
UNITED STATES PATENTS

| | | | |
|---|---|---|---|
| 3,328,136 | 6/1967 | Verakas | 126—263 |
| 1,915,018 | 6/1933 | Ehrhardt | 252—70 |
| 3,293,185 | 12/1966 | Curless | 252—70 |
| 3,535,246 | 10/1970 | Crowell | 126—263 |

WILLIAM E. SCHULZ, Primary Examiner

U.S. Cl. X.R.

252—70, 188.3, 192